(12) United States Patent
Arai et al.

(10) Patent No.: US 10,798,304 B2
(45) Date of Patent: Oct. 6, 2020

(54) OPTICAL UNIT WITH SHAKE CORRECTION FUNCTION INCLUDING CENTER-OF-GRAVITY POSITION ADJUSTING MEMBER AND METHOD FOR FIXING CENTER-OF-GRAVITY POSITION ADJUSTING MEMBER

(71) Applicant: NIDEC SANKYO CORPORATION, Suwa-gun, Nagano (JP)

(72) Inventors: Tsutomu Arai, Nagano (JP); Takashi Kanai, Nagano (JP); Toshiyuki Watanabe, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 69 days.

(21) Appl. No.: 16/256,272

(22) Filed: Jan. 24, 2019

(65) Prior Publication Data
US 2019/0238754 A1    Aug. 1, 2019

(30) Foreign Application Priority Data
Jan. 29, 2018    (JP) .................................. 2018-012231

(51) Int. Cl.
| | | |
|---|---|---|
| *H04N 5/232* | (2006.01) |
| *G03B 5/06* | (2006.01) |
| *G02B 27/64* | (2006.01) |
| *G01M 1/12* | (2006.01) |
| *G02B 7/02* | (2006.01) |

(52) U.S. Cl.
CPC ........ *H04N 5/23287* (2013.01); *G01M 1/122* (2013.01); *G02B 7/023* (2013.01); *G02B 27/646* (2013.01); *G03B 5/06* (2013.01)

(58) Field of Classification Search
CPC ....... G03B 5/06; H04N 5/23287; G02B 7/023
See application file for complete search history.

(56) References Cited

U.S. PATENT DOCUMENTS 9,810,918 B2 * 11/2017 Minamisawa ......... G02B 7/023
2017/0374247 A1 * 12/2017 Minamisawa ...... H01F 27/2823

FOREIGN PATENT DOCUMENTS

JP           2015064501 A      4/2015

* cited by examiner

*Primary Examiner* — Minh Q Phan
(74) *Attorney, Agent, or Firm* — Cantor Colburn LLP

(57) ABSTRACT

An optical unit may include a movable member. The movable member may include a lens barrel member, an imaging element, and a holder to which either one of a coil and magnet comprised in a swing-driving mechanism is attached. The optical unit may further include a fixed member to which another one of the coil and magnet is attached. The fixed member may be configured to support the movable member. The optical unit may further include a position adjusting member attached to a tubular part of the holder. The tubular part may include a subject-side end part and a stepped part. The position adjusting member may be in an annular shape to be engaged with a small outside diameter of the tubular part. A part of the small-diameter part that is not surrounded by the position adjusting member may be bent to an outer circumference side of the tubular part.

11 Claims, 13 Drawing Sheets

OPTICAL UNIT WITH SHAKE CORRECTION FUNCTION INCLUDING CENTER-OF-GRAVITY POSITION ADJUSTING MEMBER AND METHOD FOR FIXING CENTER-OF-GRAVITY POSITION ADJUSTING MEMBER

CROSS REFERENCE TO PRIOR APPLICATIONS

The present invention claims priority under 35 U.S.C. § 119 to Japanese Application No. 2018-012231, filed Jan. 29, 2018, the entire content of which is incorporated herein by reference.

BACKGROUND

At least an embodiment of the present invention relates to: an optical unit with a shake correction function including a center-of-gravity position adjusting member provided on a tubular part of a holder and configured to adjust a position of the center of gravity of a movable member; and a method for fixing the center-of-gravity position adjusting member to the tubular part.

Conventionally, as an optical unit with a shake correction function of the above kind, there is an optical unit as disclosed in Japanese Unexamined Patent Application Publication No. 2015-64501, for example.

The optical unit includes a movable member provided with an optical element and a fixed member supporting the movable member using a swing-supporting mechanism such that the movable member can swing. The fixed member accommodates the movable member such that a lens, which is the optical element, is exposed to the subject side. The movable member includes: an optical module having an imaging element and a lens barrel member for holding the optical element; and a holder for holding the optical module from the outer circumference side. A swing driving coil is attached to the movable member, and a swing driving magnet is attached to each inner wall facing each swing driving coil of the fixed member. The swing driving coils and the swing driving magnets configure a swing-driving mechanism, so that a shake correction in the pitching direction and the yawing direction is performed by swinging the movable member when a current is applied to the swing driving coils.

To a tubular part of the holder, a weight in an annular shape is attached. The weight is a center-of-gravity position adjusting member for adjusting the position of the center of gravity of the movable member, and the movable member swings around the position of the center of gravity, which is adjusted by the weight. The weight is attached and fixed to the subject-side end part of the tubular part of the holder by use of an adhesive agent.

However, in such a conventional optical unit with a shake correction function as described above, a weight is attached to the subject-side end part of the tubular part by use of an adhesive agent so that the weight is fixed and held. Therefore, there is a high risk that the weight, which tends to be configured of a relatively heavy material, falls off the subject-side end part of the tubular part due to a shock when the optical unit falls, for example, in a case where the weight is fixed and held by use of an adhesive agent. Accordingly, in order to avoid the risk of falling off, a large amount of adhesive agent is applied. As a result, a fixing/holding force of the weight to the tubular part becomes unstable and varies significantly. Further, when the weight is attached to the subject-side end part of the tubular part, the adhesive agent exists therebetween. Therefore, the attachment position of the weight tends to float off from the subject-side end part, which causes the position of the center of gravity of the movable member to vary. In addition, the work of applying an adhesive agent to the attachment position of the weight is extremely poor in workability and inferior in terms of mass productivity of the optical unit.

SUMMARY

At least an embodiment of the present invention addresses such problems as described above. Therefore, the optical unit with the shake correction function includes: a movable member including a lens barrel member configured to hold an optical element, an imaging element configured to receive a subject light to be imaged by the optical element, and a holder made of a resin material to which either one of a coil and magnet included in a swing-driving mechanism is attached; a fixed member to which the other one of the coil and magnet included in the swing-driving mechanism is attached, the fixed member being configured to support the movable member via a swing-supporting mechanism in such a manner that the movable member is able to swing; and a center-of-gravity position adjusting member attached to a tubular part of the holder that surrounds an outer circumference of the lens barrel member, the center-of-gravity position adjusting member being configured to adjust a position of the center of gravity of the movable member. The tubular part includes a subject-side end part of a predetermined length in an axial direction and a stepped part, the subject-side end part being formed to have a small outside diameter, the stepped part being formed at a position corresponding to the predetermined length away from a subject-side end surface. The center-of-gravity position adjusting member is in an annular shape having an inner circumferential surface to be engaged with an outer circumference of a small-diameter part, which is the small outside diameter of the tubular part. The inner circumferential surface of the center-of-gravity position adjusting member is formed to surround the small-diameter part in a range shorter than the predetermined length along the axial direction when a bottom end part of the inner circumferential surface of the center-of-gravity position adjusting member is in contact with the stepped part. A part of the small-diameter part that is not surrounded by the inner circumferential surface of the center-of-gravity position adjusting member is bent from an axial center side to an outer circumference side of the tubular part, so that the center-of-gravity position adjusting member is fixed to the tubular part.

According to the present configuration, the top edge part of the center-of-gravity position adjusting member is engaged with the bent part, which is a part of the small-diameter part not surrounded by the center-of-gravity position adjusting member and bent from the axial center side to the outer circumference side of the tubular part, so that movement of the center-of-gravity position adjusting member toward the subject side is regulated. Further, the bottom end part of the center-of-gravity position adjusting member is engaged with the stepped part, so that movement of the center-of-gravity position adjusting member toward the opposite side of the subject side is regulated. Therefore, the center-of-gravity position adjusting member is reliably fixed to the small-diameter part formed in the tubular part of the holder. Therefore, for example, even when the optical unit falls and gets shocked, the center-of-gravity position adjusting member, which tends to be configured of a relatively heavy material, may not fall off the subject-side end part of the tubular part in such a way as a conventional case where a center-of-gravity position adjusting member is held and fixed to a tubular part of a holder by use of an adhesive agent. That is, the center-of-gravity position adjusting member is reliably held and fixed to the small-diameter part formed in the tubular part. Therefore, such a conventional problem that a fixing/helding force of the center-of-gravity position adjusting member becomes unstable and varies significantly due to a large amount of adhesive agent applied to avoid a risk of falling off is solved. Accordingly, the center-of-gravity position adjusting member is stably held and fixed to the tubular part with a stable fixing/helding force. Furthermore, since no adhesive agent exists between the subject-side end part of the tubular part and the center-of-gravity position adjusting member unlike the conventional case, there is not a risk that the center-of-gravity position adjusting member floats in the attachment position and the center of gravity of the movable member varies. Therefore, accuracy in the attachment position of the center-of-gravity position adjusting member is improved, and accuracy of the shake correction by the swing-driving mechanism is increased. Further, since the center-of-gravity position adjusting member is fixed to the small-diameter part of the tubular part without performing the process of applying an adhesive agent, which is remarkably poor in workability, mass productivity of the optical unit is improved. Therefore, the manufacturing cost of the optical unit can be reduced.

Further, regarding at least an embodiment of the present invention, the center-of-gravity position adjusting member includes a first inclined surface formed on a surface that makes contact with the part of the small-diameter part that is bent to the outer circumference side of the tubular part. The first inclined surface is inclined toward the subject side and outward in a radial direction from an axial center of the tubular part.

According to the present configuration, because of the first inclined surface formed on the surface where the center-of-gravity position adjusting member and the small-diameter part bent to the outer circumference side of the tubular part make contact with each other, a force in the radial direction from the inside to the outside of the tubular part is applied to the small-diameter part when the small-diameter part is bent to the outer circumference side. The small-diameter part is evenly pressed against the first inclined surface of the center-of-gravity position adjusting member in an annular shape due to the force in the radial direction, so that the outer circumference thereof is tightly attached to the first inclined surface without gaps. Therefore, the center-of-gravity position adjusting member is stably held and fixed to the small-diameter part without displacement. Further, the center of the small-diameter part corresponds to the center of the center-of-gravity position adjusting member, and the center of the lens barrel member surrounded by the small-diameter part, that is, the optical axis of the optical element corresponds to the center of the center-of-gravity position adjusting member. This also increases the accuracy of the shake correction by the swing-driving mechanism.

Further, regarding the tubular part of at least an embodiment of the present invention, the part of the small-diameter part bent to the outer circumference side of the tubular part and a part of the small-diameter part surrounded by the center-of-gravity position adjusting member and not bent are arranged to have a same thickness.

Further, the center-of-gravity position adjusting member is regulated so as not to slip off the tubular part because the top end part of the center-of-gravity position adjusting member is engaged with the bent part of the small-diameter part, which is bent to the outer circumference side of the tubular part, so that the bent part counteracts the center-of-gravity position adjusting member having the force to slip off. Therefore, the force of the bent part that counteracts the center-of-gravity position adjusting member having the force to slip off becomes larger with increase in the thickness of the bent part. According to the present configuration, in a case where the thickness of the bent part and the thickness of the part of the small-diameter part surrounded by the center-of-gravity position adjusting member and not bent are arranged to be the same thickness, the thickness of the bent part, which can be obtained by simply bending the small-diameter part, is the maximum thickness, which corresponds to the maximum force opposing to the center-of-gravity position adjusting member having the force to slip off. Therefore, according to the present configuration, even in a case where a significant impact is applied to the center-of-gravity position adjusting member due to falling of the optical unit, etc., the bent part does not get broken and the center-of-gravity position adjusting member stays held by the bent part and fixed to the subject-side end part of the tubular part.

Further, regarding at least an embodiment of the present invention, a groove is formed on a subject side surface of the center-of-gravity position adjusting member in such a manner that an inner rim of a predetermined length is left in a radial direction.

The shorter the length in the radial direction where the small-diameter part, which is bent to the outer circumference of the tubular part, makes contact with the subject-side end surface of the center-of-gravity position adjusting member is, the less stress is applied to the bent part when an impact is applied to the center-of-gravity position adjusting member, and therefore the force to hold and fix the center-of-gravity position adjusting member to the subject-side end part of the tubular part is improved. On the other hand, it is difficult to keep the length of the bent part of the small-diameter part, which is bent to the outer circumference side of the tubular part, to be a constant length. However, according to the present configuration, by forming a groove on the subject-side surface of the center-of-gravity position adjusting member, it is possible to keep the length of the center-of-gravity position adjusting member that makes contact with the bent part to be a constant length. Therefore, by forming the groove, with which an inner rim of a predetermined length is left on the surface on the subject side of the center-of-gravity position adjusting member in the radial direction, so as to make the length in the radial direction as short as the predetermined length, it is possible to set the force to hold and fix the center-of-gravity position adjusting member to the subject-side end part of the tubular part to be a predetermined large force.

Further, regarding at least an embodiment of the present invention, at least one projection part or depression part is formed on a surface of the center-of-gravity position adjusting member that makes contact with the part of the small-diameter part that is bent to the outer circumference side of the tubular part.

According to the present configuration, in a case where the resin of the small-diameter part is engaged with a projection part or a depression part, which is formed on the surface where the center-of-gravity position adjusting member makes contact with the small-diameter part, the contact area of each part is larger, so that the force of fixing the center-of-gravity position adjusting member to the small-diameter part is improved and movement of the center-of-gravity position adjusting member in the circumferential direction of the small-diameter part is resisted. Therefore, it is possible to prevent the center-of-gravity position adjusting member from rotating around the small-diameter part after the small-diameter part is bent to the outer circumference side of the tubular part to fix the center-of-gravity position adjusting member to the small-diameter part.

Further, regarding at least an embodiment of the present invention, the center-of-gravity position adjusting member includes a second inclined surface formed on a surface on an opposite side of the subject side. The second inclined surface is inclined toward the subject side and outward in a radial direction from the axial center of the tubular part.

According to the present configuration, in a case where a spring member defining the initial position of the movable member that swings exists on the opposite side of the subject side of the center-of-gravity position adjusting member, the center-of-gravity position adjusting member and the spring member are prevented from making contact with each other due to the second inclined surface 2 formed on the surface on the opposite side of the subject side of the center-of-gravity position adjusting member. Therefore, the function of the plate spring defining the initial position of the movable member that swings is exhibited without being disturbed.

Further, regarding at least an embodiment of the present invention, only a part of the subject-side end part of the small-diameter part where the subject light to be received by the imaging element passes in close proximity is bent, so as to fix the center-of-gravity position adjusting member to the tubular part.

According to the present configuration, only a part of the subject-side end part of the small-diameter part, where the subject light to be received by the imaging element passes in close vicinity, is partially bent to the outer circumference side, so that an upstanding part, which is not bent, can be left as the subject-side end part of the small-diameter part without affecting the angle of view of an image to be captured by the imaging element. Therefore, while ensuring the angle of view of an captured image, it is possible to inspect swinging characteristics of the movable member by using the protruding end surface of the upstanding part as a reference surface for measuring the position of the movable member.

Further, regarding at least an embodiment of the present invention, an entire circumference of the subject-side end part of the small-diameter part is bent, so as to fix the center-of-gravity position adjusting member to the tubular part.

According to the present configuration, when the bent part of the small-diameter part of the optical unit is seen from the outside, the appearance of the bent part looks better since the entire circumference of the subject-side end part of the small-diameter part is bent. In addition, in the conventional configuration in which the center-of-gravity position adjusting member is held and fixed to the subject-side end part of the tubular part by use of an adhesive agent, there has been a need for a wiping process to remove an unnecessary adhesive agent protruding from the attachment position for cleaning the appearance after completion of the process of applying the adhesive agent. However, in the present configuration, the wiping process is not necessary.

Further, at least an embodiment of the present invention includes: a mounting step in which the inner circumference of the center-of-gravity position adjusting member is engaged with the outer circumference of the small-diameter part, and the center-of-gravity position adjusting member is inserted into the small-diameter part until the bottom end part of the center-of-gravity position adjusting member makes contact with the stepped part; and a fusing step in which a heater chip in a predetermined shape is brought into contact with the subject-side end part of the small-diameter part and heated to a predetermined temperature, and a pressure is applied to the heater chip in a direction opposite to the subject side to pressurize the subject-side end part of the small-diameter part, so that the part of the small-diameter part that is not surrounded by the center-of-gravity position adjusting member is bent from the axial center side to the outer circumference side of the tubular part, so as to fix the center-of-gravity position adjusting member to the tubular part according to any one of the optical units with a shake correction function as described above.

According to the fixing method of the present configuration, the subject-side end part of the tubular part is bent from the axial center side to the outer circumference side by use of heat, so that the center-of-gravity position adjusting member in any one of the optical units with a shake correction function as described above is reliably fixed to the tubular part as described above.

Further, regarding at least an embodiment of the present invention, the heater chip has such a shape that makes contact with only the part of the subject-side end part of the small-diameter part where the subject light to be received by the imaging element passes in close proximity, so as to pressurize only the part of the subject-side end part in the direction opposite to the subject side.

According to the present configuration, the center-of-gravity position adjusting member is fixed to the tubular part, such that an upstanding part that is not bent is left as the subject-side end part of the small-diameter part.

Further, regarding at least an embodiment of the present invention, the heater chip has such a shape that makes contact with the entire circumference of the subject-side end part of the small-diameter part, so as to pressurize the entire circumference of the subject-side end part in a direction opposite to the subject side.

According to the present configuration, the entire circumference of the subject-side end part of the small-diameter part is bent to the outer circumference side of the tubular part, so that the center-of-gravity position adjusting member is reliably fixed to the tubular part.

According to the optical unit with a shake correction function including the center-of-gravity position adjusting member in at least an embodiment of the present invention and the method for fixing the center-of-gravity position adjusting member, the center-of-gravity position adjusting member is reliably and stably held and fixed to the small-diameter part formed in the tubular part by a stable fixing/holding force without a risk of falling off the subject-side end part of the tubular part. Therefore, accuracy in the attachment position of the center-of-gravity position adjusting member is improved, and accuracy of the shake correction by the swing-driving mechanism is increased. Further, mass productivity of the optical unit is improved, and the manufacturing cost of the optical unit can be reduced.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Next, an explanation is given of an optical unit with a shake correction function including a center-of-gravity position adjusting member according to at least an embodiment of the present invention and a mode for implementing a method for fixing the center-of-gravity position adjusting member.

(Overall Configuration)

Figure 1:
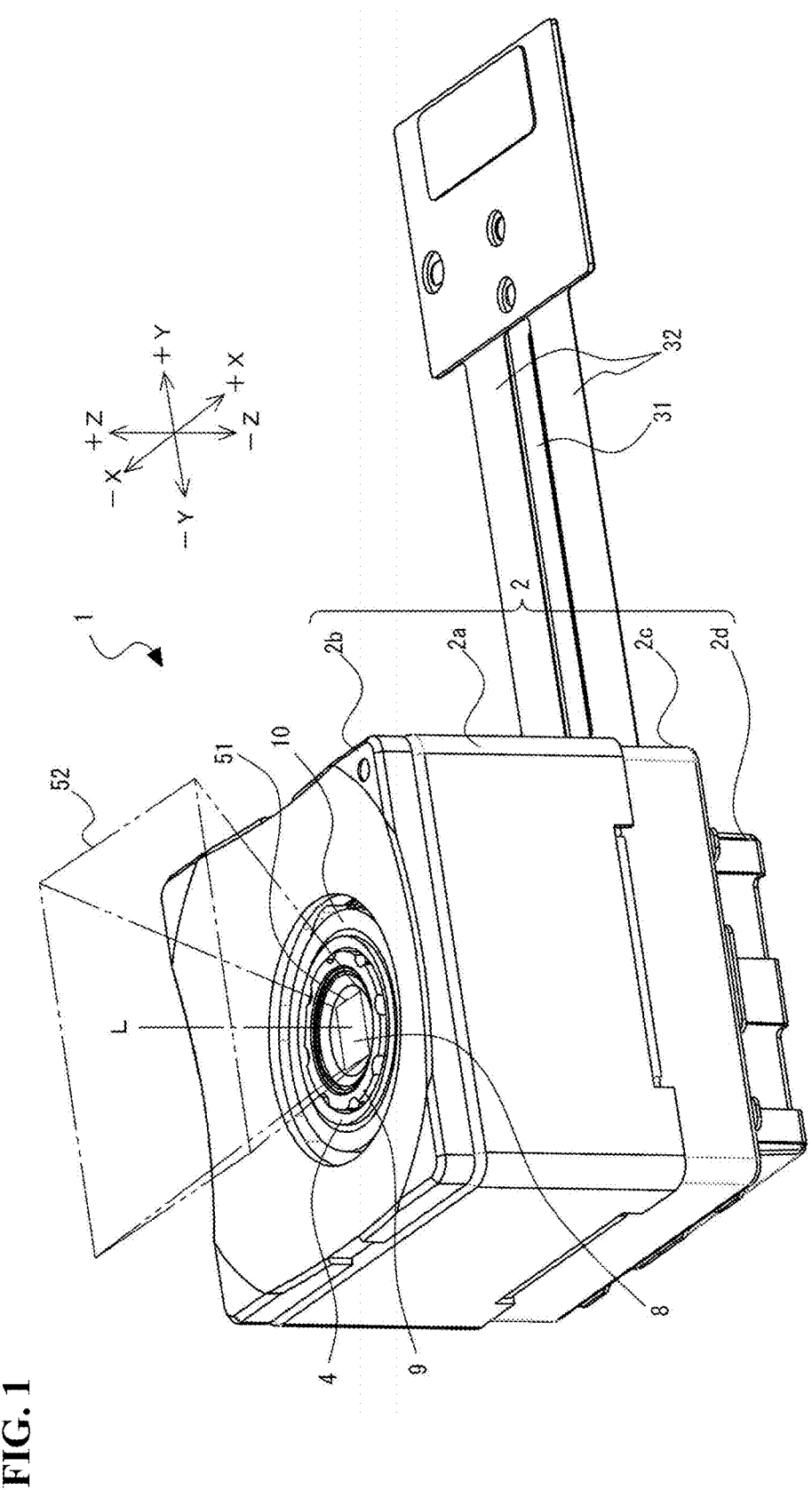
FIG. 1 is an external perspective view of an optical unit with a shake correction function including a center-of-gravity position adjusting member according to an embodiment of the present invention.
Figure 2:
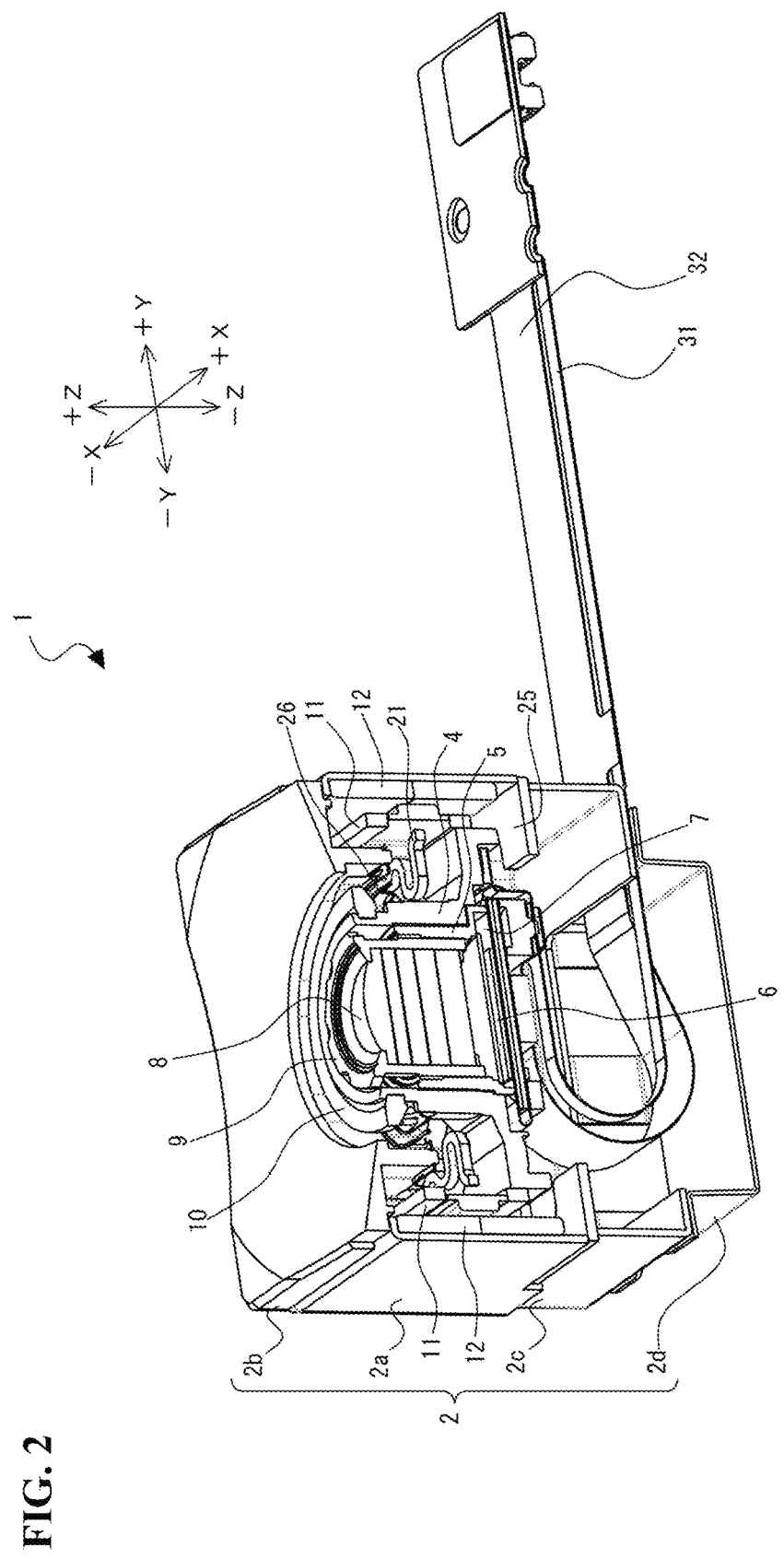
FIG. 2 is a vertical cross-sectional view of the entirety of the optical unit with the shake correction function according to the embodiment.
Figure 3:
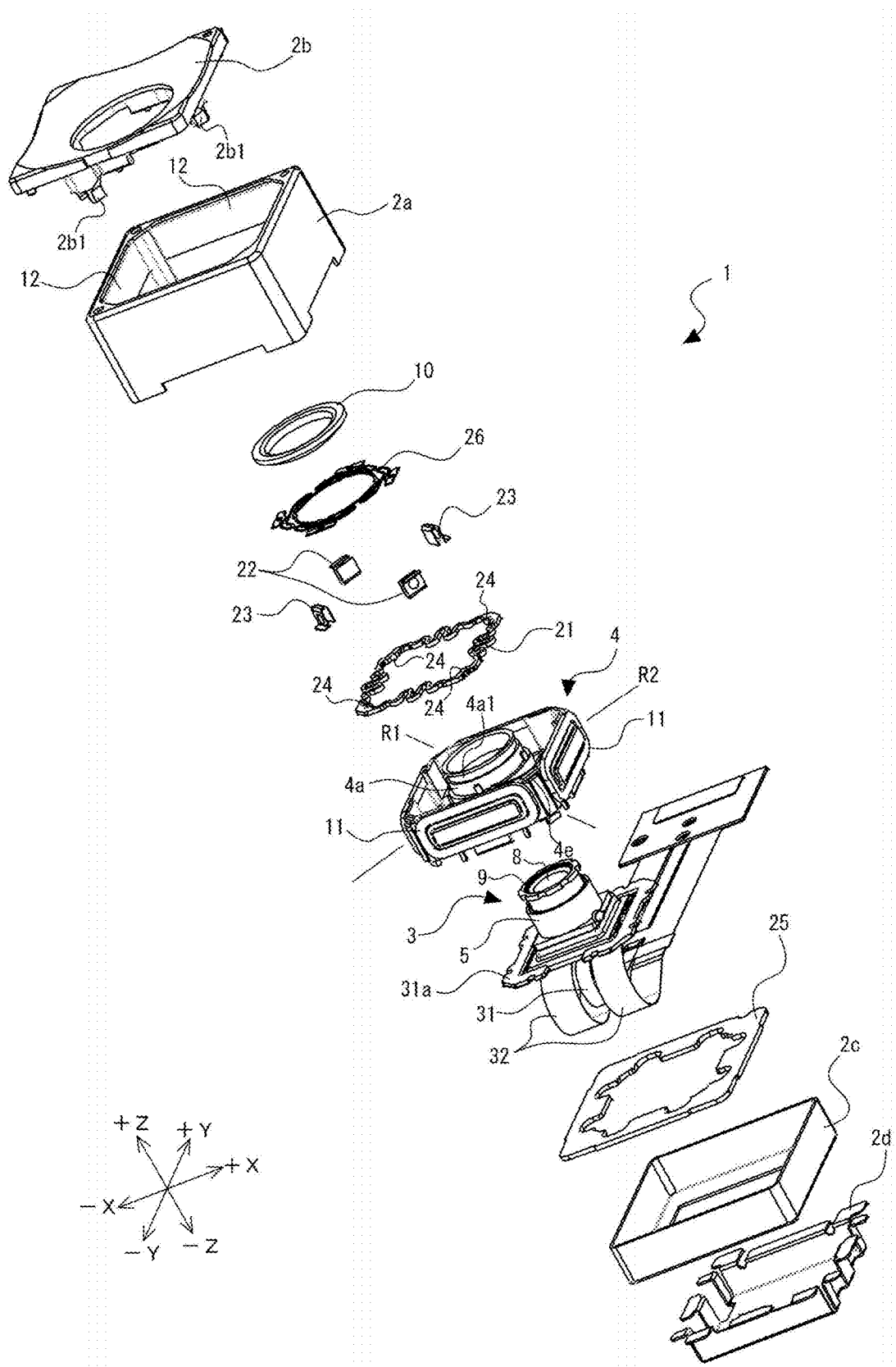
FIG. 3 is an exploded perspective view of the optical unit with the shake correction function according to the embodiment.

FIG. 1 is an external perspective view, FIG. 2 is a vertical cross-sectional view, and FIG. 3 is an exploded perspective view of an optical unit 1 with a shake correction function according to an embodiment of the present invention.

In the present specification, the same or corresponding parts are explained with the same reference signs. Additionally, directions of three axes X, Y and Z illustrated in each drawing are orthogonal to each other. Further, one side of the X-axis direction is indicated by +X and the other side is indicated by −X. Further, one side of the Y-axis direction is indicated by +Y and the other side is indicated by −Y. Further, one side of the Z-axis direction is indicated by +Z and the other side is indicated by −Z. The Z-axis direction is a direction along the optical axis L of the lens 8 mounted on the below-described movable member 3 of the optical unit 1 in a state where the movable member 3 is not swinging. Further, the +Z direction is the object side (i.e., subject side) in the optical axis L direction, and the −Z direction is the image side (i.e., opposite side of the subject side (counter-subject side)) in the optical axis L direction.

The optical unit 1 includes a fixed member 2 including a tubular casing 2a, a subject-side casing 2b, a counter-subject-side casing 2c, and a bottom plate 2d. The tubular casing 2a has a rectangular tubular shape and is formed of a magnetic material. The subject-side casing 2b is attached to the tubular casing 2a from the +Z direction side (i.e., subject side), and the counter-subject-side casing 2c is attached to the tubular casing 2a from the −Z direction side (i.e., counter-subject side). Further, the bottom plate 2d is attached to the counter-subject-side casing 2c from the counter-subject side. The subject-side casing 2b, the counter-subject-side casing 2c, and the bottom plate 2d are formed of a resin material.

Inside the fixed member 2, the movable member 3 is supported by the holder 4 and accommodated therein. As illustrated in FIG. 2, the outer circumference of the sensor cover 5 is fixed in the inner circumference of the holder 4, and the circuit board 7 on which the imaging element 6 is mounted is held on the counter-subject side of the sensor cover 5. The lens 8 is exposed at the opening part of the subject-side casing 2b, and the lens 8 causes a subject light to be incident on the imaging element 6 from the +Z direction. A male thread is engraved on the outer circumference of the lens barrel member 9, and the male thread is engaged with a female thread engraved on the inner circumference of the sensor cover 5 so that the lens barrel member 9 is fixed to the sensor cover 5. The lens 8 and the lens barrel member 9 configure an optical module, and a camera module is configured with the optical module, the imaging element 6, and the circuit board 7. Further, the weight 10 is fixed to the subject-side end part of the holder 4.

(Center-of-Gravity Position Adjusting Member)

Figure 4:
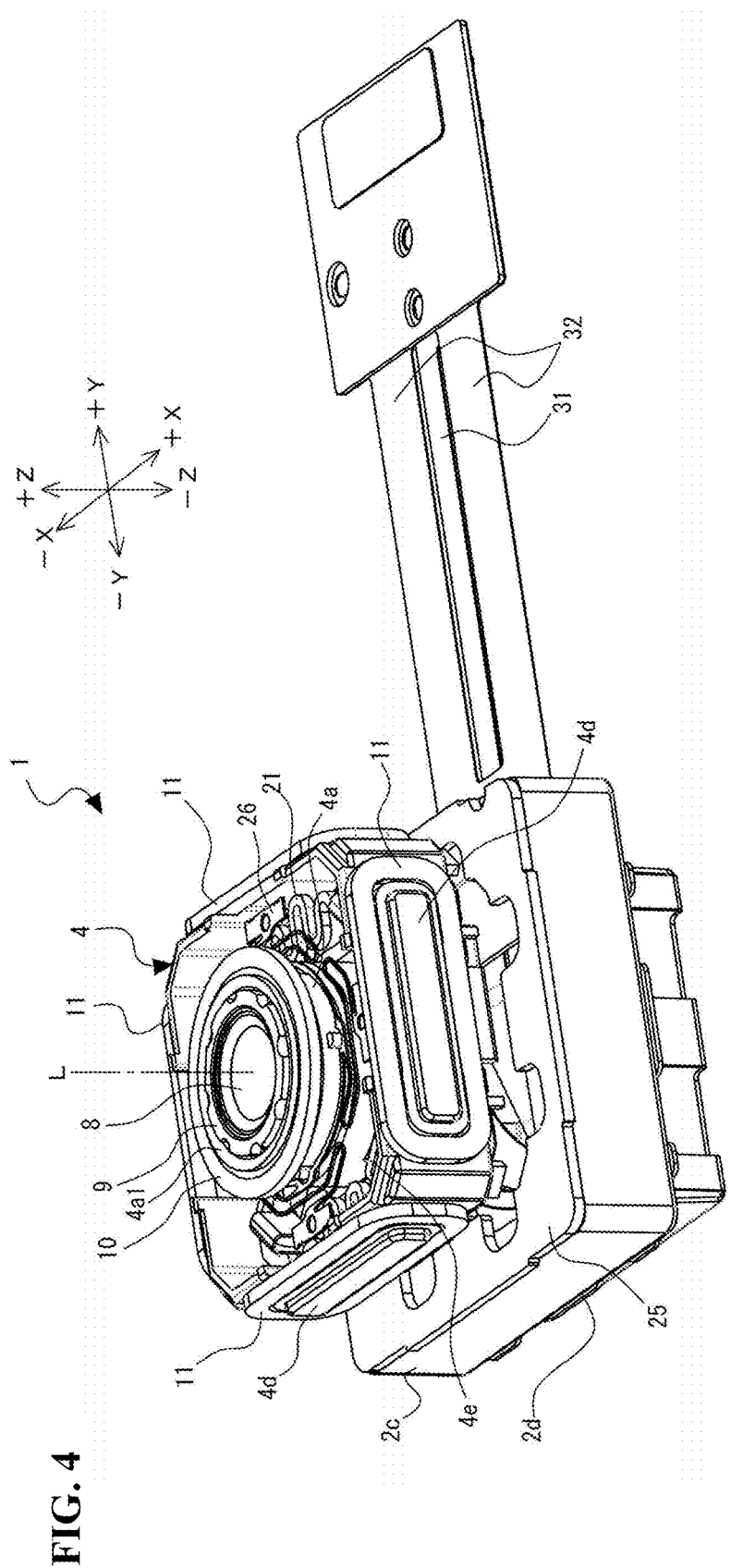
FIG. 4 is a perspective view in which a tubular casing and a subject-side casing are detached from the optical unit with the shake correction function according to the embodiment so that a weight is viewed from above.
Figure 5:
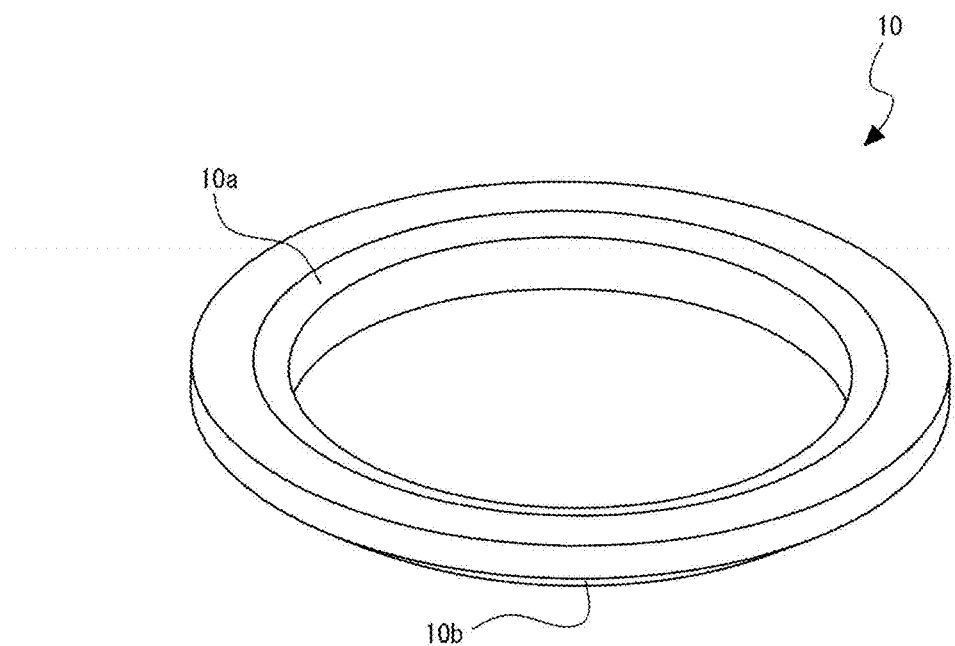
FIG. 5 is a perspective view of the weight included in the optical unit with the shake correction function according to the embodiment.
Figure 6:
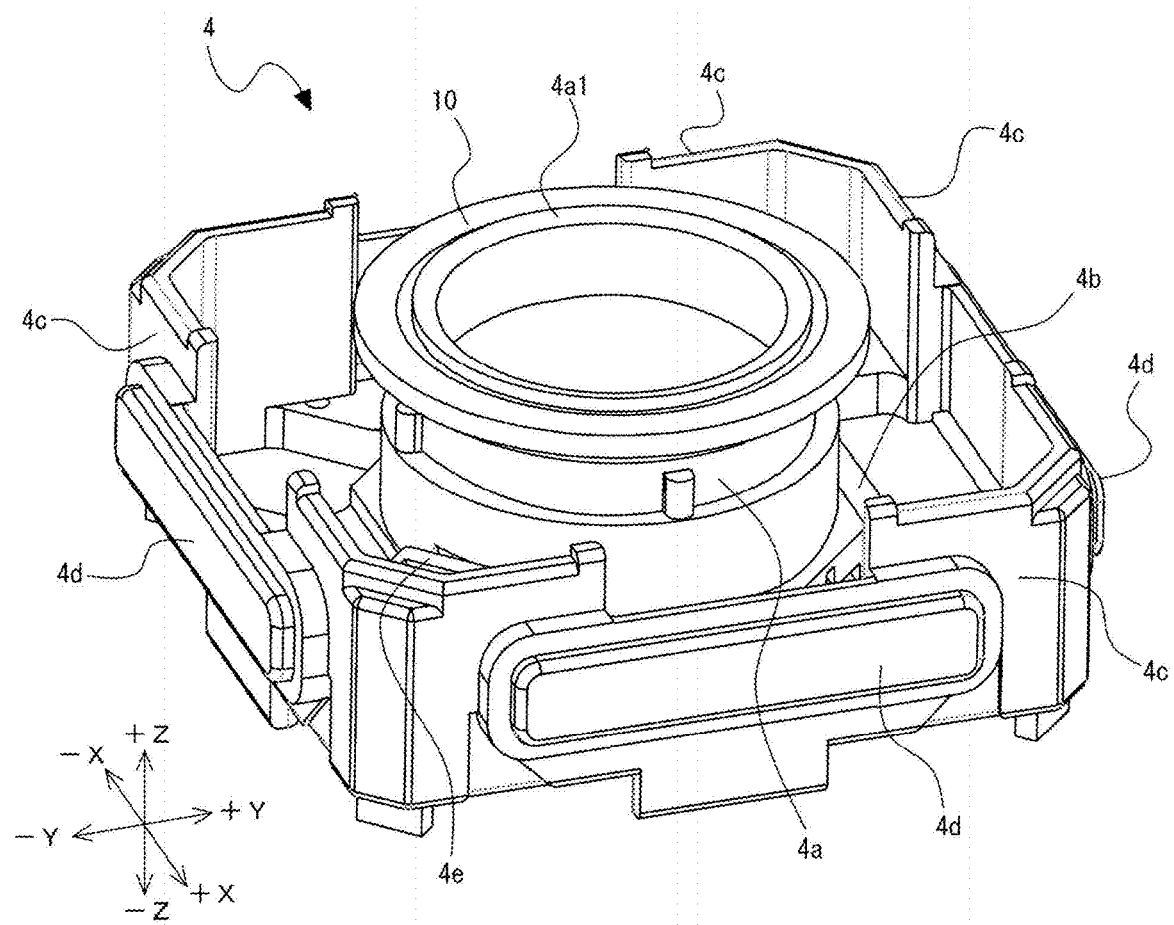
FIG. 6 is a perspective view in which the weight is attached to a single holder included in the optical unit with the shake correction function according to the embodiment.
Figure 7:
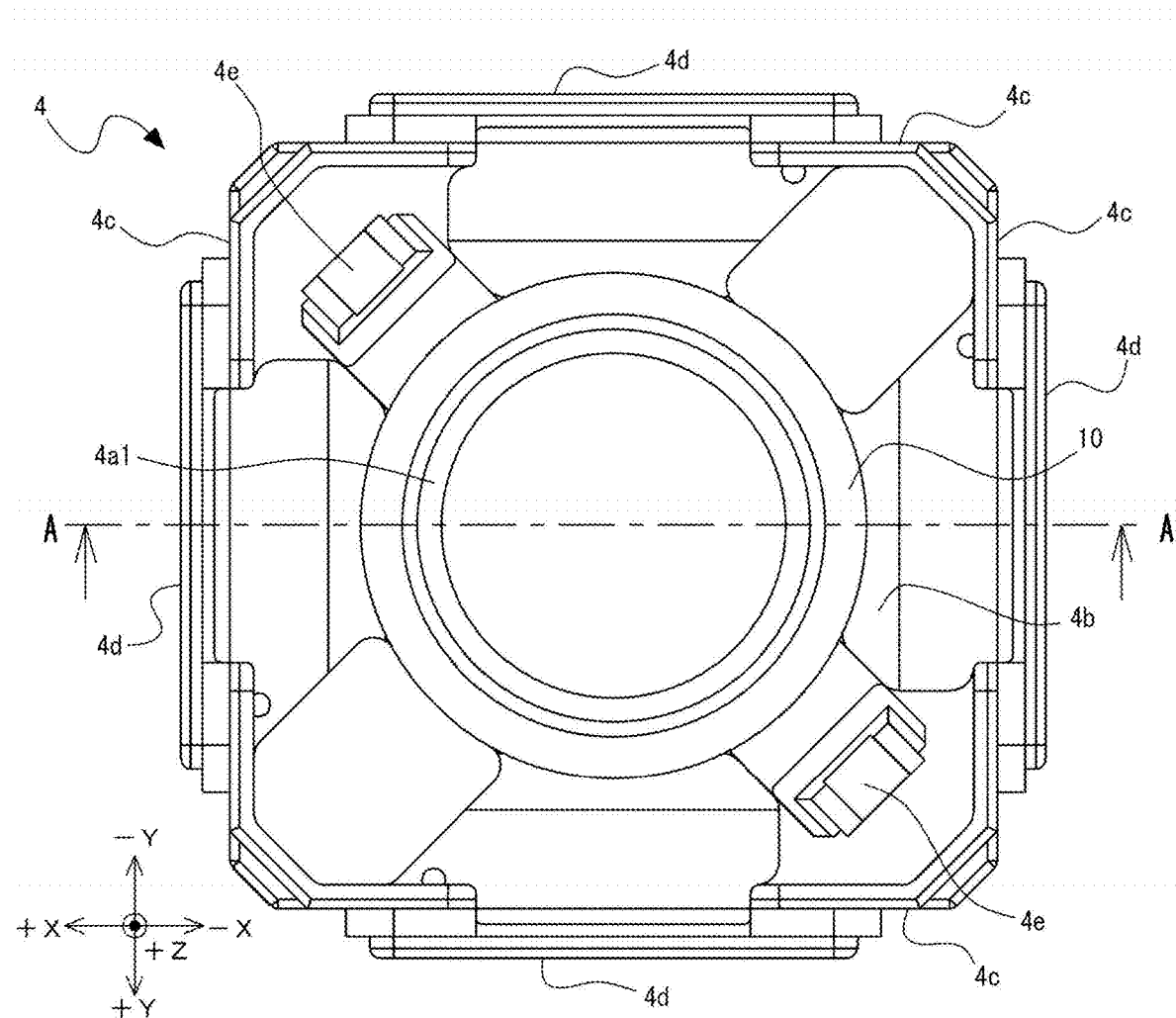
FIG. 7 is a plan view of the holder to which the weight is attached as illustrated in FIG. 6.

FIG. 4 is a perspective view in which the tubular casing 2a and the subject-side casing 2b are detached from the optical unit 1 so that the weight 10 is viewed from above. The external appearance of the weight 10 is illustrated in the perspective view of FIG. 5, and the weight 10 is attached to the tubular part 4a of the holder 4 surrounding the outer circumference of the lens barrel member 9 as illustrated in the perspective view of FIG. 6 and the plan view of FIG. 7. FIG. 6 and FIG. 7 illustrate the single holder 4, to which the weight 10 is attached. The holder 4 is made of a resin, and the tubular part 4a in a cylindrical shape is upstanding at the center of the bottom plate part 4b on the Z-axis as the central axis. The central axis of the tubular part 4a corresponds to the optical axis L of the lens 8 fixed and held by the lens barrel member 9.

Figure 8:
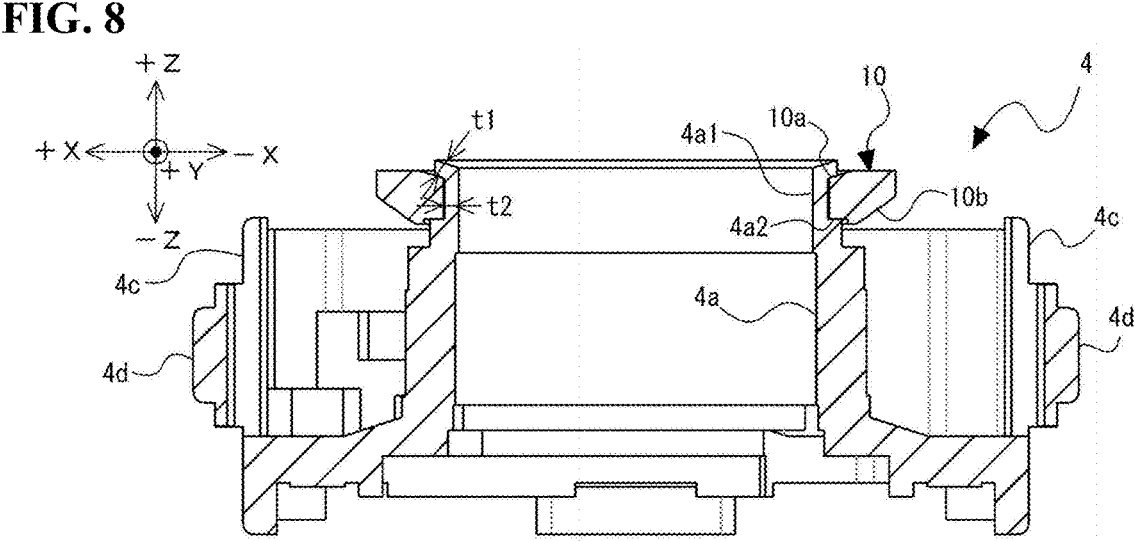
FIG. 8 is a vertical cross-sectional view of the holder as illustrated in FIG. 7, which is taken along line A-A and viewed from the arrow direction.

FIG. 8 is a view taken along line A-A and viewed in the arrow direction illustrated in FIG. 7, in which the weight 10 is attached to the holder 4. The tubular part 4a has a small-diameter part 4a1 of a predetermined length in the axial direction, where the outside diameter of the subject-side end part is formed to be small. Further, the tubular part 4a has a stepped part 4a2 formed at a position corresponding to the predetermined length away from the subject-side end surface of the small-diameter part 4a1 before being bent. The weight 10 is in such an annular shape having an inner circumferential surface to be engaged with the outer circumference of the small-diameter part 4a1. Further, the inner circumferential surface of the weight 10 is in such a shape surrounding the small-diameter part 4a1 in a range shorter than the predetermined length along the axial direction when the bottom end part of the inner circumferential surface of the weight 10 is in contact with the stepped part 4a2. The weight 10 is fixed to the tubular part 4a when the part of the small-diameter part 4a1 which is not in contact with or surrounded by the inner circumferential surface of the weight 10 is bent from the axial side to the outer circumference side of the tubular part 4a. In the present embodiment, the thickness t1 of the part of the small-diameter part 4a1 bent to the outer circumference side of the tubular part 4a and the thickness t2 of the part of the small-diameter part 4a1 surrounded by the inner circumferential surface of the weight 10 and not bent are arranged to be the same thickness. The weight 10 configures the center-of-gravity position adjusting member for adjusting the position of the center of gravity of the movable member 3.

In the present embodiment, the weight 10 has a first inclined surface 10a, which is formed on the surface making contact with the part of the small-diameter part 4a1 bent to the outer circumference side of the tubular part 4a. The first inclined surface 10a is inclined toward the +Z side, which is the subject side, and outward in the radial direction from the axial center of the tubular part 4a. Further, the weight 10 has a second inclined surface 10b, which is formed on the −Z side surface, i.e., the opposite side of the subject side. The second inclined surface 10b is inclined toward the subject side and outward in the radial direction from the axial center of the tubular part 4a.

(Swing-Driving Mechanism)

At four positions on both sides in the X-axis direction and the Y-axis direction of the bottom plate part 4b of the holder 4, there are wall parts 4c upstanding in the +Z direction. On the outer circumferential side of each of the four wall parts 4c, there are coil attachment parts 4d projecting in an elliptical shape, respectively. Further, to each of the coil attachment parts 4d, a swing driving coil 11 is attached as illustrated in FIG. 4. Furthermore, as illustrated in FIG. 2 and FIG. 3, swing driving magnets 12 are attached to both inner walls facing each other in the X-axis direction of the tubular casing 2a and to both inner walls facing each other in the Y-axis direction of the tubular casing 2a, such that the swing driving magnets 12 face the swing driving coils 11, respectively. The swing driving coils 11 and the swing driving magnets 12 configure a swing-driving mechanism. Note that the swing-driving mechanism may be configured such that the swing driving coils 11 are provided on the tubular casing 2a side and the swing driving magnets 12 are provided on the holder 4 side.

(Swing-Supporting Mechanism)

Between the fixed member 2 and the movable member 3, a gimbal mechanism for supporting the movable member 3 such that the movable member 3 can swing relative to the fixed member 2 is configured as a swing-supporting mechanism around a first axis R1 and a second axis R2, which are orthogonal to the Z-axis direction and diagonal relative to the X-axis direction and the Y-axis direction at 45 degrees (c.f., FIG. 3). The swing-supporting mechanism includes a movable frame 21 surrounding the outer circumference of the movable member 3. A pair of first contact springs 22 illustrated in FIG. 3 are attached to first swing-supporting parts 4e provided at two diagonal positions on the first axis R1 on the outer circumference of the tubular part 4a of the holder 4 (c.f., FIG. 7). Further, a pair of second contact springs 23 are attached to second swing-supporting parts 2b1 provided at two diagonal positions on the second axis R2 on the subject-side casing 2b configuring the fixed member 2. The first contact springs 22 and the second contact springs 23 are plate-shaped springs.

To four positions on the inner circumference of the movable frame 21, balls 24 are fixed. The balls 24 are in point-contact with the first contact springs 22 and the second contact springs 23, which are held by the first swing-supporting parts 4e and the second swing-supporting parts 2b1, respectively. The first contact springs 22 attached to the first swing-supporting parts 4e can be elastically deformed in the first axis R1 direction and the second contact springs 23 attached to the second swing-supporting parts 2b1 can be elastically deformed in the second axis R2 direction. The holder 4 is supported by the movable frame 21 such that the holder 4 can swing around the first axis R1 by use of the pair of balls 24 and the pair of first contact springs 22 provided at the diagonal positions on the first axis R1. Furthermore, the movable frame 21 is supported by the fixed member 2 such that the movable frame 21 can swing around the second axis R2 by use of the pair of balls 24 and the pair of second contact springs 23 provided at the diagonal positions on the second axis R2.

As a result, the movable member 3, which is attached to the holder 4, is supported by the fixed member 2 such that the movable member 3 can swing around the first axis R1 and the second axis R2. In the fixed member 2, a plate-shaped stopper 25 in a shape of a rectangular frame is disposed so as to surround the movable member 3. The movable range of the movable member 3 toward the −Z side in the Z-axis direction, i.e., the counter-subject side, is regulated by the plate-shaped stopper 25.

Furthermore, the plate spring 26 illustrated in FIG. 3 is overlaid between the subject-side annular end surface of the tubular part 4a and the counter-subject-side end surface of the subject-side casing 2b. The plate spring 26 configures a spring member that defines the reference posture of the movable member 3 relative to the fixed member 2. That is, when the swing driving coils 11 are not driven, i.e., in a stationary state, the posture of the movable member 3 is held by the plate spring 26 to the reference posture, in which the optical axis L of the lens 8 held by the movable member 3 corresponds to the Z-axis.

(Shake Correction)

The optical unit 1 includes flexible printed circuit boards 31 and 32. The flexible printed circuit board 31 has a rectangular frame portion 31a (c.f., FIG. 3) extending along the outer rim of the counter-subject-side end part of the holder 4. Further, each of the swing driving coils 11 is connected to the rectangular frame portion 31a. To each of the swing driving coils 11, a drive current is supplied by the flexible printed circuit board 31. The flexible printed circuit board 32 is electrically connected to the circuit board 7 held by the movable member 3.

When a current is applied to each of the swing driving coils 11 via the flexible printed circuit board 31, a magnetic driving force is generated between each swing driving coil 11 and each swing driving magnet 12. Regarding subject images captured by the camera module, an image shake in the pitching direction around the X-axis and in the yawing direction around the Y-axis, which is detected by a gyroscope provided in the movable member 3, is corrected since the movable member 3 swings relative to the fixed member 2 around the first axis R1 and around the second axis R2 because of the magnetic driving force.

(Fusing Method)

Figure 9A:
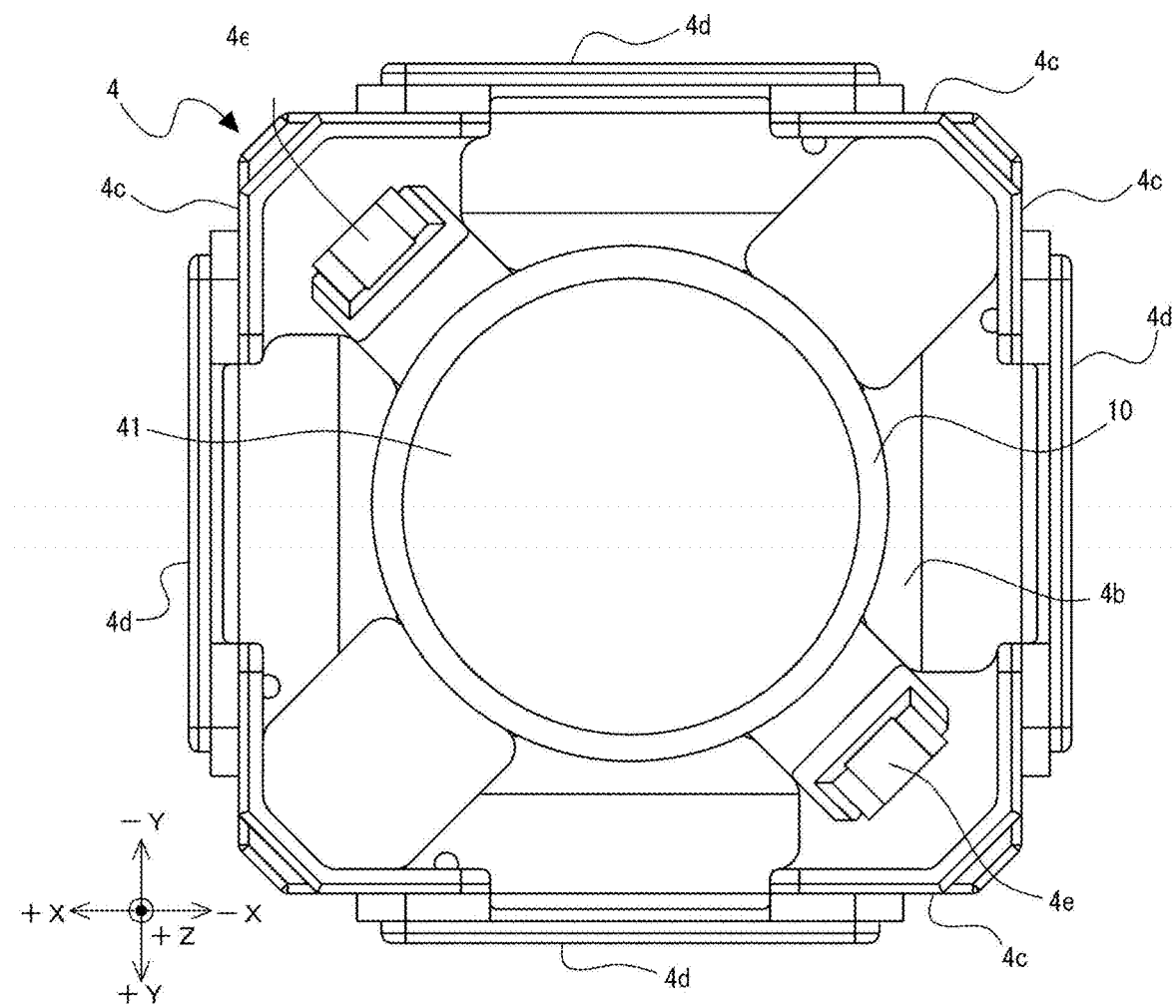
FIG. 9A is a plan view in which a fusing step is performed such that a heater chip used to fix the weight to the tubular part of the holder included in the optical unit with the shake correction function according to the embodiment is pressed against the subject-side end part of a small-diameter part of the tubular part.
Figure 9B:
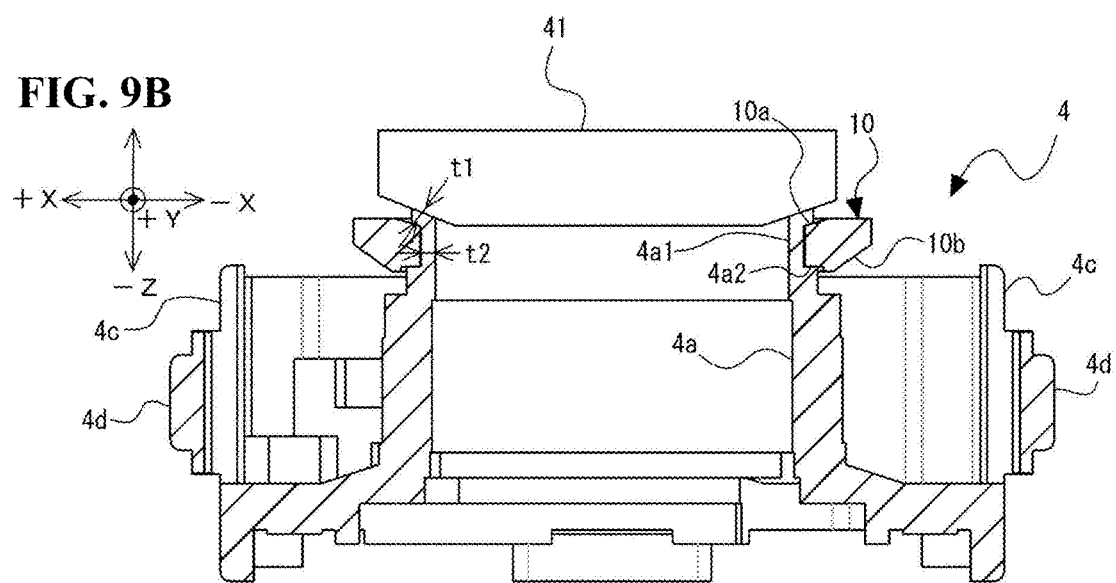
FIG. 9B is a vertical cross-sectional view of the fusing step.

The weight 10 of the optical unit 1 with such a configuration as described above is fixed to the tubular part 4a of the holder 4 in the following way. First, as a mounting step, the inner circumference of the weight 10 is engaged with the outer circumference of the small-diameter part 4a1 whose end part is not bent, and the weight 10 is inserted into the small-diameter part 4a1 until the bottom end part of the weight 10 makes contact with the stepped part 4a2. Next, the heater chip 41 in the shape illustrated in FIG. 9A and FIG. 9B is brought into contact with the subject-side end part of the small-diameter part 4a1. Further, the heater chip 41 is heated to a predetermined temperature, and a pressure is applied to the heater chip 41 in the direction opposite to the subject side, so as to perform a fusing step in which the subject-side end part of the small-diameter part 4a1 is pressurized. Here, FIG. 9A is a plan view in which a fusing step is performed such that the heater chip 41 is pressed against the subject-side end part of the small-diameter part 4a1. Further, FIG. 9B is a cross-sectional view of the fusing process. At the fusing step, for example, the heater chip 41 is heated to 210° C. and the heater chip 41 is pressed against the subject-side end part of the small-diameter part 4a1 by a weight of 5 kgW for three seconds. Through the above fusing step, the part of the small-diameter part 4a1 not surrounded by the weight 10 is bent from the axial center side to the outer circumference side of the tubular part 4a as illustrated.

In the present embodiment, as illustrated in FIG. 9A and FIG. 9B, the heater chip 41 has such a shape that makes contact with the entire circumference of the subject-side end part of the small-diameter part 4a1, so as to pressurize the entire circumference of the subject-side end part of the small-diameter part 4a1 toward the opposite side of the subject side, i.e., in the −Z direction. Therefore, the entire circumference of the subject-side end part of the small-diameter part 4a1 is bent to the outer circumference side of the tubular part 4a, so that the weight 10 is reliably fixed to the tubular part 4a.

(Function Effect)

According to the optical unit 1 in the present embodiment, the top edge part of the weight 10 is engaged with the bent part, which is a part of the small-diameter part 4a1 not surrounded by the weight 10 and bent from the axial center side to the outer circumference side of the tubular part 4a, so that movement of the weight 10 toward the subject side is regulated. Further, the bottom end part of the weight 10 is engaged with the stepped part 4a2, so that movement of the weight 10 toward the opposite side of the subject side is regulated. Therefore, the weight 10 is reliably fixed to the small-diameter part 4a1 formed in the tubular part 4a of the holder 4. Therefore, for example, even when the optical unit 1 falls and gets shocked, the weight 10, which tends to be configured of a relatively heavy material, may not fall off the subject-side end part of the tubular part 4a in such a way as a conventional case where a weight is held and fixed to a tubular part of a holder by use of an adhesive agent. That is, the weight 10 is reliably held and fixed to the small-diameter part 4a1 formed in the tubular part 4a. In comparison with the conventional case in an experiment regarding a fixing/helding force of the weight 10 to the tubular part 4a, the fixing/helding force was about 30N in the conventional configuration where a weight is fixed to a tubular part of a holder by use of an adhesive agent. However, in the configuration of the present embodiment in which the weight 10 is fixed to the tubular part 4a by fusing, it was confirmed that a fixing/helding force of 50N or more could be ensured.

Therefore, such a conventional problem that a fixing/helding force of the weight 10 becomes unstable and varies significantly due to a large amount of adhesive agent applied to avoid a risk of falling off is solved. Accordingly, the weight 10 is stably held and fixed to the tubular part 4a with a stable fixing/helding force. Furthermore, since no adhesive agent exists between the subject-side end part of the tubular part 4a and the weight 10 unlike the conventional case, there is not a risk that the weight 10 floats in the attachment position and the center of gravity of the movable member 3 varies. It was confirmed that the floating of the weight 10 did not occur in the above-described experiment. Therefore, accuracy in the attachment position of the weight 10 is improved, and accuracy of the shake correction by the swing-driving mechanism is increased. Further, since the weight 10 is fixed to the small-diameter part 4a1 of the tubular part 4a without performing the process of applying an adhesive agent, which is remarkably poor in workability, mass productivity of the optical unit 1 is improved. Therefore, the manufacturing cost of the optical unit 1 can be reduced.

Further, according to the optical unit 1 of the present embodiment, because of the first inclined surface 10a (c.f., FIG. 8) formed on the surface where the weight 10 and the small-diameter part 4a1 bent to the outer circumference side of the tubular part 4a make contact with each other, a force in the radial direction from the inside to the outside of the tubular part 4a is applied to the small-diameter part 4a1 when the small-diameter part 4a1 is bent to the outer circumference side. The small-diameter part 4a1 is evenly pressed against the first inclined surface 10a of the weight 10 in the annular shape due to the force in the radial direction, so that the outer circumference thereof is tightly attached to the first inclined surface 10a without gaps. Therefore, the weight 10 is stably held and fixed to the small-diameter part 4a1 without displacement. Further, the center of the small-diameter part 4a1 corresponds to the center of the weight 10, and the center of the lens barrel member 9 surrounded by the small-diameter part 4a1, that is, the optical axis L of the lens 8 corresponds to the center of the weight 10. This also increases the accuracy of the shake correction by the swing-driving mechanism.

Further, the weight 10 is regulated so as not to slip off the tubular part 4a because the top end part of the weight 10 is engaged with the bent part of the small-diameter part 4a1, which is bent to the outer circumference side of the tubular part 4a, so that the bent part counteracts the weight 10 having the force to slip off. Therefore, the force of the bent part of the small-diameter part 4a1 that counteracts the weight 10 having the force to slip off becomes larger with increase in the thickness t1 of the bent part. In a case where the thickness t1 of the bent part and the thickness t2 of the part of the small-diameter part 4a1 surrounded by the weight 10 and not bent are arranged to be the same thickness in the optical unit 1 of the present embodiment, the thickness t1 of the bent part, which can be obtained by simply bending the small-diameter part 4a1 without, for example, regulating the resin of the bent part from becoming flatter at the time of bending, is the maximum thickness, which corresponds to the maximum force opposing to the weight 10 having the force to slip off. Therefore, according to the optical unit 1 of the present embodiment, even in a case where a significant impact is applied to the weight 10 due to falling of the optical unit 1, etc., the bent part does not get broken and the weight 10 stays held by the bent part and fixed to the subject-side end part of the tubular part 4a.

Further, according to the optical unit 1 of the present embodiment, the weight 10 is fixed to the tubular part 4a by bending the entire circumference of the subject-side end part of the small-diameter part 4a1. Therefore, as in the optical unit 1 of the present embodiment, when the bent part of the small-diameter part 4a1 of the optical unit 1 is seen from the outside through the opening part formed at the central part of the subject-side casing 2b, the appearance of the bent part looks better since the entire circumference of the subject-side end part of the small-diameter part 4a1 is bent. In addition, in the conventional configuration in which the weight 10 is held and fixed to the subject-side end part of the tubular part 4a by use of an adhesive agent, there has been a need for a wiping process to remove an unnecessary adhesive agent protruding from the attachment position for cleaning the appearance after completion of the process of applying the adhesive agent. However, in the present configuration where the entire circumference of the subject-side end part of the small-diameter part 4a1 is bent to fix the weight 10, the wiping process is not necessary.

Further, in the present embodiment, the plate spring 26 defining the original position of the movable member 3 that swings exists on the opposite side of the subject side of the weight 10 as illustrated in FIG. 2. According to the optical unit 1 of the present embodiment, the weight 10 and the plate spring 26 are prevented from making contact with each other because of the second inclined surface 10b formed on the surface of the weight 10 on the opposite side of the subject side. Therefore, the function of the plate spring 26 defining the initial position of the movable member 3 that swings is exhibited without being disturbed.

Variation Example

Figure 10A:
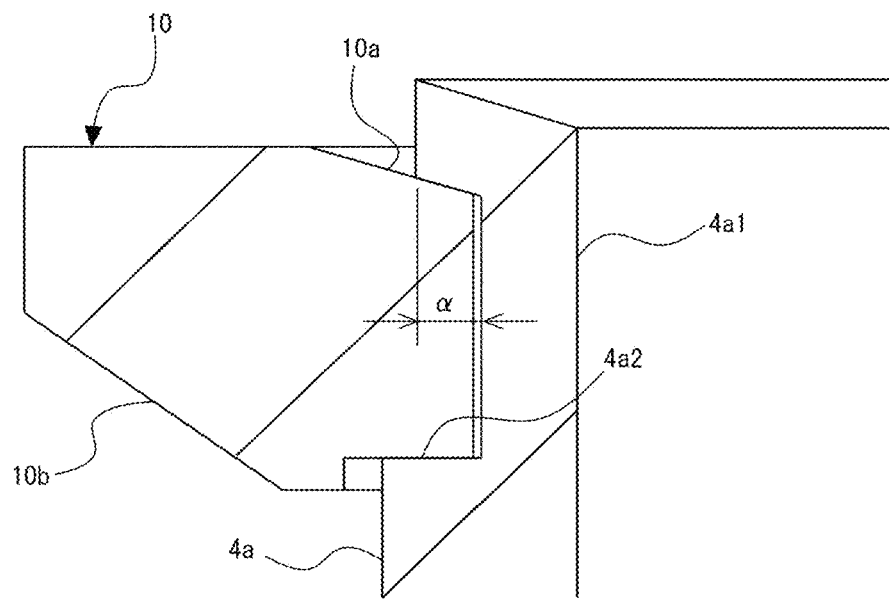
FIG. 10A is a partially-enlarged cross-sectional view of the small-diameter part of the tubular part of the holder included in the optical unit with the shake correction function according to the embodiment.
Figure 10B:
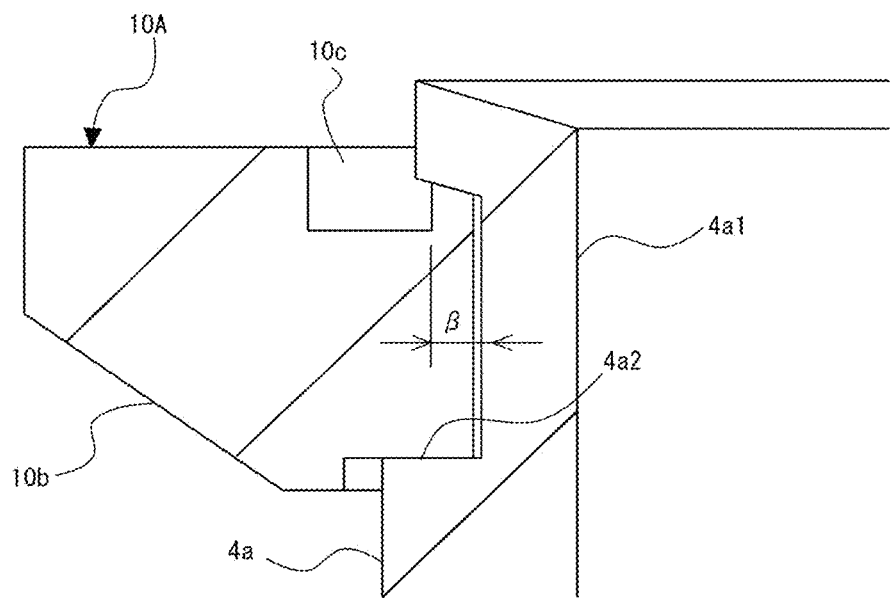
FIG. 10B is a partially-enlarged cross-sectional view of a small-diameter part of a tubular part of a holder included in an optical unit according to a first variation example of the embodiment.
Figure 11:
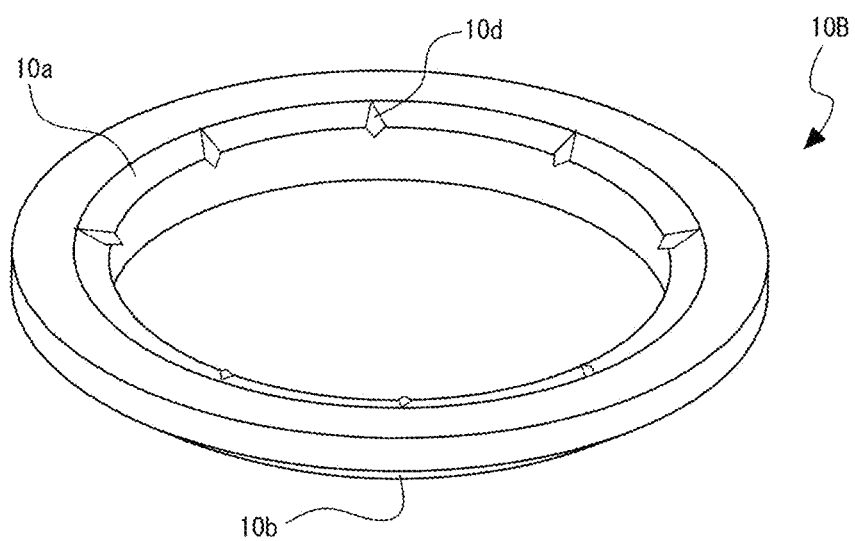
FIG. 11 is a perspective view of a weight included in an optical unit according to a second variation example of the first embodiment.

The shorter the length α (c.f., FIG. 10A) in the radial direction where the small-diameter part 4a1, which is bent to the outer circumference of the tubular part 4a, makes contact with the subject-side end surface of the weight 10 is, the less stress is applied to the bent part of the small-diameter part 4a1 when an impact is applied to the weight 10, and therefore the force to hold and fix the weight 10 to the subject-side end part of the tubular part 4a is improved. FIG. 10A is a partially-enlarged cross-sectional view of a bent part of the small-diameter part 4a1. However, it is difficult to keep the length of the bent part of the small-diameter part 4a1, which is bent to the outer circumference side of the tubular part 4a, to be a constant length. Therefore, as with a weight 10A in the optical unit 1 according to the first variation example of the present embodiment illustrated in FIG. 10B, it is preferable that a groove 10c is formed on the subject-side surface such that an inner rim of only a predetermined length β is left in the radial direction. According to the optical unit 1 in the first variation example, by forming the groove 10c on the subject-side surface of the weight 10A, it is possible to keep the length in the radial direction where the weight 10A makes contact with the bent part to be the predetermined length β. Therefore, by forming the groove 10c, with which an inner rim of a predetermined length is left on the surface on the subject side of the weight 10A in the radial direction, so as to make the length β in the radial direction as short as the predetermined length, it is possible to set the force to hold and fix the weight 10A to the subject-side end part of the tubular part 4a to be a predetermined large force.

Furthermore, as with the weight 10B of the optical unit 1 according to the second variation example of the present embodiment, there may be a configuration in which at least one groove 10d is formed on the first inclined surface 10a, which makes contact with the small-diameter part 4a1 bent to the outer circumference side of the tubular part 4a. Further, not only such a groove 10d, but there may be a configuration in which at least one projection part or depression part is formed on the surface that makes contact with the small-diameter part 4a1 bent to the outer circumference side of the tubular part 4a. According to the present configuration, in a case where the resin of the small-diameter part 4a1 is engaged with a groove 10d, a projection part, or a depression part, which is formed on the surface where the weight 10B makes contact with the small-diameter part 4a1, the contact area of each part is larger, so that the force of fixing the weight 10B to the small-diameter part 4a1 is improved and movement of the weight 10B in the circumferential direction of the small-diameter part 4a1 is resisted. Therefore, it is possible to prevent the weight 10B from rotating around the small-diameter part 4a1 after the small-diameter part 4a1 is bent to the outer circumference side of the tubular part 4a by fusing to fix the weight 10B to the small-diameter part 4a1, due to, for example, displacement of mutual parts caused by different linear expansion coefficients of materials of the weight 10B and the small-diameter part 4a1. Furthermore, in order to reliably prevent the weight 10B from rotating around the small-diameter part 4a1, fixation by fusing and fixation by use of an adhesive agent may be combined.

Figure 12:
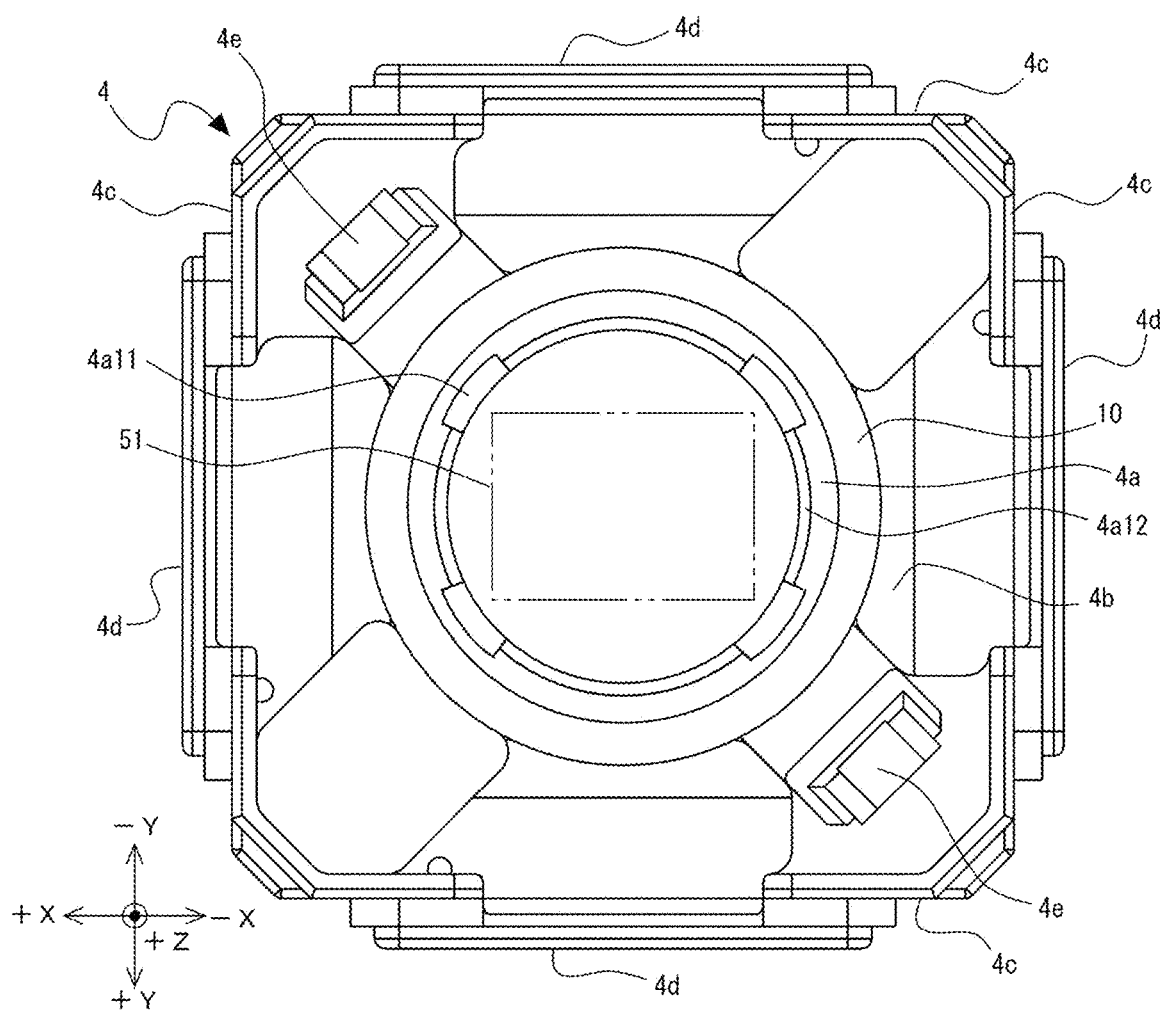
FIG. 12 is a plan view in which a weight is attached to a single holder included in an optical unit according to a third variation example of the embodiment.

Furthermore, as with the weight 10 of the optical unit 1 according to the third variation example of the present embodiment as illustrated in the plan view of FIG. 12, there may be a configuration in which only an subject-side end part 4a11 of the small-diameter part 4a1 where a subject light to be received by the imaging element 6 passes in close proximity is bent, so as to to fix the weight 10 to the tubular part 4a. The rectangle shape indicated by the two-dot chain line in FIG. 12 is indicative of the range of a subject light to be received by the imaging element 6 and corresponds to the angle of view 51 of an image to be captured. The image area 52 in the angle of view 51 is indicated by the two-dot chain line in FIG. 1. The subject-side end part 4a12 of the small-diameter part 4a1, which is not bent, is upstanding in the +Z direction such that the subject-side end part 4a12 is higher than the subject-side end part 4a11, which is bent. According to the present configuration, only the subject-side end part 4a11 of the small-diameter part 4a1 where a subject light to be received by the imaging element 6 passes in close proximity is partially bent to the outer circumference side, so that the height thereof is formed to be low in the +Z direction. Accordingly, the subject-side end part 4a11 does not overlap with the image area 52. That is, only the subject-side end part 4a11 is partially bent toward the outer circumference side, so that an upstanding part, which is not bent, can be left as the subject-side end part 4a12 of the small-diameter part 4a1 without affecting the angle of view 51 of an image to be captured by the imaging element 6. Therefore, while ensuring the angle of view 51 of an captured image, it is possible to inspect swinging characteristics of the movable member 3 by using the protruding end surface of the subject-side end part 4a12 as a reference surface for measuring the position of the movable member 3. Furthermore, by pouring an adhesive agent into the gap between the outer circumference of the upstanding subject-side end part 4a12 and the inner circumference of the weight 10, it is possible to combine fixation of the weight 10 to the tubular part 4a by fusing and fixation by use of an adhesive agent, so as to achieve more reliable fixation.

Figure 13:
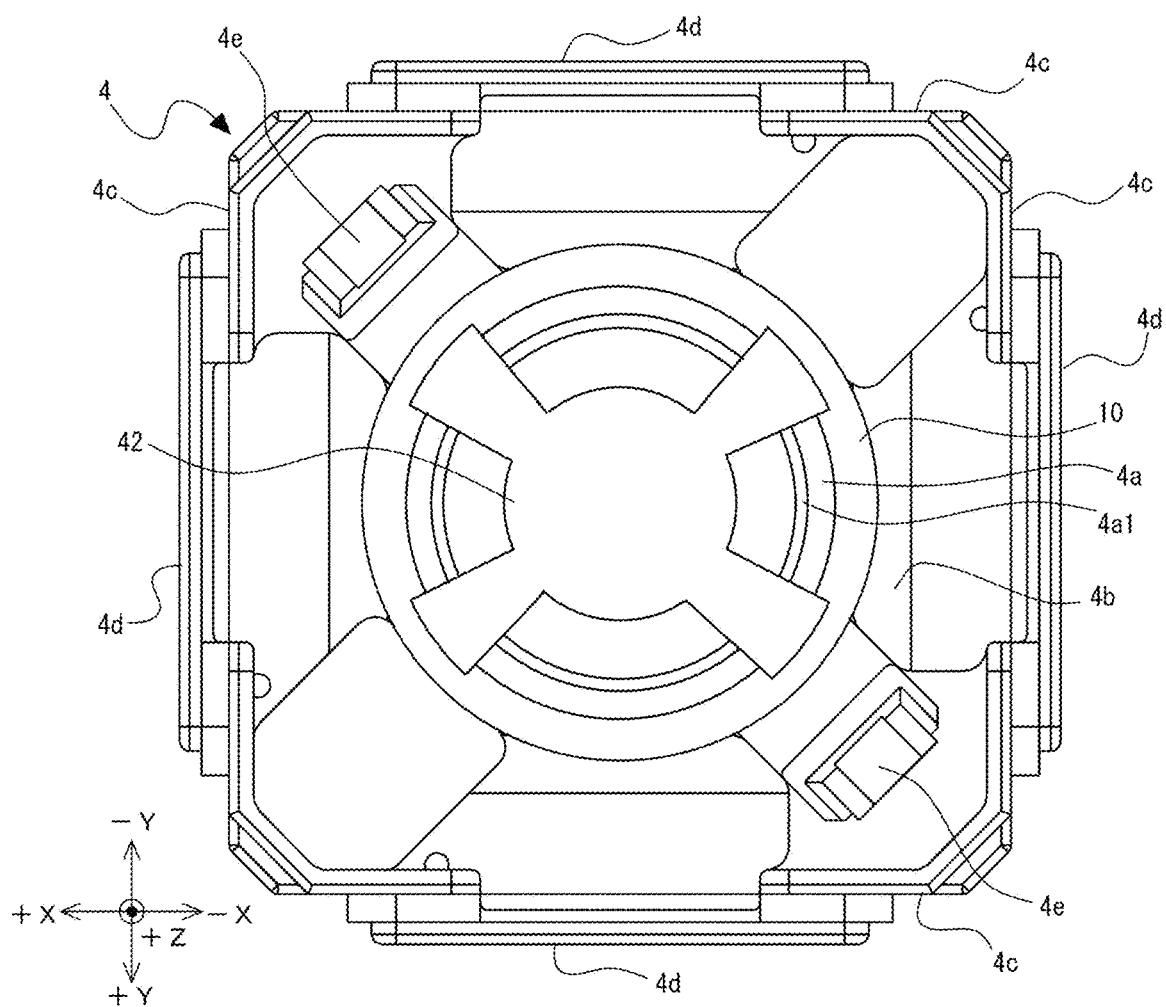
FIG. 13 is a plan view in which a fusing step is performed such that a heater chip used for fixing the weight to a tubular part of the holder included in the optical unit according to the third variation example of the embodiment is pressed against the subject-side end part of a small-diameter part of the tubular part.

The heater chip 42 illustrated in the plan view of FIG. 13 is used for bending only the subject-side end part 4a11 of the small-diameter part 4a1 where a subject light to be received by the imaging element 6 passes in close proximity as illustrated in FIG. 12. The heater chip 42 has such a shape that makes contact with only the subject-side end part 4a11 of the small-diameter part 4a1 where a subject light to be received by the imaging element 6 passes in close proximity, so as to press only the subject-side end part 4a11 in the direction opposite to the subject side. Because of the heater chip 42, the weight 10 is fixed to the tubular part 4a, such that an upstanding part that is not bent is left as the subject-side end part 4a12 of the small-diameter part 4a1.

The optical unit 1 with a shake correction function according to the present embodiment can be used for an optical device such as a cellular phone device with a camera or a drive recorder, or for an optical device such as an action camera or a wearable camera mounted on a mobile object such as a helmet, a bicycle or a radio control helicopter. In such an optical device, when a shake occurs in the optical device at the time of shooting, a distortion occurs in captured images. However, the optical unit 1 with a shake correction function according to the present embodiment accurately performs a shake correction by a swing-driving mechanism configured to swing the movable member 3, of which the center-of-gravity position is adjusted by the weight 10 with high accuracy as described above, relative to the fixed member 2, so that occurrence of a shake in captured images is avoided with high accuracy.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function comprising a center-of-gravity position adjusting member, the optical unit with the shake correction function comprising:
   a movable member comprising a lens barrel member configured to hold an optical element, an imaging element configured to receive a subject light to be imaged by the optical element, and a holder made of a resin material to which either one of a coil and magnet comprised in a swing-driving mechanism is attached;
   a fixed member to which another one of the coil and magnet comprised in the swing-driving mechanism is attached, the fixed member being configured to support the movable member via a swing-supporting mechanism in such a manner that the movable member is able to swing; and
   the center-of-gravity position adjusting member attached to a tubular part of the holder that surrounds an outer circumference of the lens barrel member, the center-of-gravity position adjusting member being configured to adjust a position of a center of gravity of the movable member, wherein
   the tubular part comprises a subject-side end part of a predetermined length in an axial direction and a stepped part, the subject-side end part being formed to have a small outside diameter, the stepped part being formed at a position corresponding to the predetermined length away from a subject-side end surface,
   the center-of-gravity position adjusting member is in an annular shape having an inner circumferential surface to be engaged with an outer circumference of a small-diameter part, which is the small outside diameter of the tubular part,
   the inner circumferential surface of the center-of-gravity position adjusting member is formed to surround the small-diameter part in a range shorter than the predetermined length along the axial direction when a bottom end part of the inner circumferential surface of the center-of-gravity position adjusting member is in contact with the stepped part, and
   a part of the small-diameter part that is not surrounded by the inner circumferential surface of the center-of-gravity position adjusting member is bent from an axial center side to an outer circumference side of the tubular part, so that the center-of-gravity position adjusting member is fixed to the tubular part.

2. The optical unit with the shake correction function comprising the center-of-gravity position adjusting member according to claim 1, wherein the center-of-gravity position adjusting member comprises a first inclined surface formed on a surface that makes contact with the part of the small-diameter part that is bent to the outer circumference side of the tubular part, the first inclined surface being inclined toward the subject side and outward in a radial direction from an axial center of the tubular part.

3. The optical unit with the shake correction function comprising the center-of-gravity position adjusting member according to claim 1, wherein, regarding the tubular part, the part of the small-diameter part bent to the outer circumference side of the tubular part and a part of the small-diameter part surrounded by the center-of-gravity position adjusting member and not bent are arranged to have a same thickness.

4. The optical unit with the shake correction function comprising the center-of-gravity position adjusting member according to claim 1, wherein a groove is formed on a subject side surface of the center-of-gravity position adjusting member in such a manner that an inner rim of a predetermined length is left in a radial direction.

5. The optical unit with the shake correction function comprising the center-of-gravity position adjusting member according to claim 1, wherein at least one projection part or depression part is formed on a surface of the center-of-gravity position adjusting member which makes contact with the part of the small-diameter part that is bent to the outer circumference side of the tubular part.

6. The optical unit with the shake correction function comprising the center-of-gravity position adjusting member according to claim 1, wherein the center-of-gravity position adjusting member comprises a second inclined surface formed on a surface on an opposite side of the subject side, the second inclined surface being inclined toward the subject side and outward in a radial direction from the axial center of the tubular part.

7. The optical unit with the shake correction function comprising the center-of-gravity position adjusting member according to claim 1, wherein only a part of the subject-side end part of the small-diameter part where the subject light to be received by the imaging element passes in close proximity is bent, so as to fix the center-of-gravity position adjusting member to the tubular part.

8. The optical unit with the shake correction function comprising the center-of-gravity position adjusting member according to claim 1, wherein an entire circumference of the subject-side end part of the small-diameter part is bent, so as to fix the center-of-gravity position adjusting member to the tubular part.

9. A method for fixing a center-of-gravity position adjusting member in which the center-of-gravity position adjusting member of the optical unit with the shake correction function according to claim 1 is fixed to the tubular part, the method comprising:
 a mounting step comprising engaging the inner circumference of the center-of-gravity position adjusting member with the outer circumference of the small-diameter part, and inserting the center-of-gravity position adjusting member into the small-diameter part until a bottom end part of the center-of-gravity position adjusting member makes contact with the stepped part; and
 a fusing step comprising bringing a heater chip in a predetermined shape into contact with the subject-side end part of the small-diameter part and heated to a predetermined temperature, and applying a pressure to the heater chip in a direction opposite to the subject side to pressurize the subject-side end part of the small-diameter part, so that the part of the small-diameter part that is not surrounded by the center-of-gravity position adjusting member is bent from the axial center side to the outer circumference side of the tubular part.

10. The method for fixing the center-of-gravity position adjusting member according to claim 9, wherein
 only a part of the subject-side end part of the small-diameter part where the subject light to be received by the imaging element passes in close proximity is bent, so as to fix the center-of-gravity position adjusting member to the tubular part, and
 the heater chip has such a shape that makes contact with only the part of the subject-side end part of the small-diameter part where the subject light to be received by the imaging element passes in close proximity, so as to pressurize only the part of the subject-side end part in the direction opposite to the subject side.

11. The method for fixing the center-of-gravity position adjusting member according to claim 9, wherein
 an entire circumference of the subject-side end part of the small-diameter part is bent, so as to fix the center-of-gravity position adjusting member to the tubular part, and
 the heater chip has such a shape that makes contact with the entire circumference of the subject-side end part of the small-diameter part, so as to pressurize the entire circumference of the subject-side end part in a direction opposite to the subject side.

\* \* \* \* \*